Patented Oct. 13, 1936

2,056,944

UNITED STATES PATENT OFFICE 2,056,944

COLORING MATTERS OF THE LEAD PHTHALOCYANINE SERIES AND THEIR MANUFACTURE

Reginald Patrick Linstead and Charles Enrique Dent, South Kensington, London, England, assignors to Imperial Chemical Industries Limited, a corporation of Great Britain No Drawing. Application June 7, 1935, Serial No. 25,500. In Great Britain June 11, 1934

8 Claims. (Cl. 260—11)

This invention relates to novel dyestuffs of the phthalocyanine series and to a process for preparing the same. More particularly, it is an object of this invention to produce novel compounds of the phthalocyanine series which, while possessing the good thermal stability and other valuable characteristics of the general dyestuffs of this series, are characterized by novel shades different from the average colors of this series. Other and further important objects of this invention will appear as the description proceeds.

In British specifications Nos. 322,169, 389,842, 390,149 and 410,814 there are described the manufacture of certain blue to green coloring matters of complex constitution. We have now found that we can make another of these coloring matters, namely a green, brighter than any described in the above specifications by heating phthalonitrile or the metal-free phthalocyanine with substances containing lead.

By metal-free phthalocyanine we mean the metal-free compound obtainable either from o-cyanobenzamide as described in specification No. 389,842, or from phthalonitrile as described in specification No. 410,814.

Specification No. 389,842 describes the production of a dull blue coloring matter by heating o-cyanobenzamide and lead oxide to 300°. This coloring matter is much brighter after treatment with sulphuric acid but is not green.

Substances containing lead are metallic lead and lead compounds. Lead compounds are oxides, sulphides and salts of lead. Salts of lead include lead carbonate, acetate and chloride. Preferred substances containing lead are lead monoxide, lead carbonate and metallic lead.

The new bright green coloring matter contains lead and has the empirical formula $C_{32}H_{16}N_8Pb$. It dissolves in concentrated sulphuric acid with a brown color and the solution, on pouring into water gives a blue precipitate of metal-free phthalocyanine. It is insoluble in water and insoluble or almost insoluble in all the customary liquid organic solvents. It has high thermal stability. It gives bright green shades when used as a pigment.

The following examples in which parts are by weight illustrate but do not limit the invention.

Example 1.—An intimate mixture of 128 parts (4 molecular proportions) of phthalonitrile and 56 parts (1 molecular proportion) of litharge is heated to about 230° C. in one hour and then kept at 230–240° C. for four hours. After cooling the product is obtained as a bright green coloring matter which is suitable for use without purification. It is broken up and ground with water and a dispersing agent to an aqueous paste. The yield appears to be almost theoretical.

Example 2.—The litharge used in Example 1 is replaced by an atomic proportion of lead in the form of foil and heated to 260–270° C. for eight hours or thereabouts until formation of the lead compound appears to be complete. The same coloring matter is obtained as in Example 1.

Example 3.—64 parts (4 molecular proportions) of phthalonitrile and 34 parts (1 molecular proportion) of lead carbonate are heated as in Example 1 but at 250–260° C. and the same coloring matter again obtained.

Example 4.—5.2 parts of the metal-free phthalocyanine obtained by heating phthalonitrile with sodium in amyl alchol solution according to specification No. 410,814 and 2.3 parts of litharge are intimately mixed and heated to 250° C. for about three hours, until the weak blue color of the mixture has completely changed to green. The same coloring matter is obtained as before.

We claim:

1. Process for the manufacture of a green coloring matter of the phthalocyanine series which comprises heating a substance chosen from the group consisting of phthalonitrile and metal-free phthalocyanine, with a substance containing lead but containing no other metals and no dye-forming groups.

2. Process as claimed in claim 1 in which the substance containing lead is a compound chosen from the group consisting of binary and ternary compounds of lead which contain no other metals.

3. Process as claimed in claim 1, in which the substance containing lead is metallic lead.

4. Process as claimed in claim 1, in which the substance containing lead is an oxide of lead.

5. Process for the manufacture of green coloring matter of the phthalocyanine series which consists in heating phthalonitrile with lead monoxide.

6. Process for the manufacture of green coloring matter of the phthalocyanine series which consists in heating phthalonitrile with lead carbonate.

7. Coloring matter of the phthalocyanine series containing combined lead, said coloring matter being characterized by producing bright green shades when used as a pigment, said coloring matter being insoluble in water and being possessed of good thermal stability.

8. Coloring matter of the phthalocyanine series being substantially identical with the product obtained by heating phthalonitrile with litharge at a temperature of about 230–240° C., said coloring matter being distinguished from other coloring matters of the phthalocyanine series by containing combined lead and by producing bright green shades when used as a pigment.

REGINALD PATRICK LINSTEAD.
CHARLES ENRIQUE DENT.